United States Patent
McKeon et al.

(10) Patent No.: US 6,349,521 B1
(45) Date of Patent: Feb. 26, 2002

(54) VEHICLE BUMPER BEAM WITH NON-UNIFORM CROSS SECTION

(75) Inventors: R. Clayton McKeon, Holland; Peter Sturrus, Ludington; Mark D. Weissenborn, Grand Rapids, all of MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 09/335,828

(22) Filed: Jun. 18, 1999

(51) Int. Cl.$^7$ ................................................. E04C 3/30
(52) U.S. Cl. ................... 52/735.1; 52/730.4; 52/731.2; 52/731.6; 52/745.19; 293/102; 293/120; 293/122; 72/370.21; 72/370.23; 72/370.26
(58) Field of Search .............................. 52/730.4, 731.2, 52/731.6, 735.1, 745.19; 293/102, 120, 122; 72/370.21, 370.23, 370.26

(56) References Cited

U.S. PATENT DOCUMENTS

| | | | |
|---|---|---|---|
| 4,201,000 A | * 5/1980 | Stanford | 52/117.5 |
| 4,762,352 A | 8/1988 | Enomoto | |
| 4,961,603 A | 10/1990 | Carpenter | |
| 5,080,410 A | * 1/1992 | Stewart | 293/102 |
| 5,080,411 A | 1/1992 | Stewart et al. | |
| 5,080,412 A | * 1/1992 | Stewart | 293/155 |
| 5,100,187 A | * 3/1992 | Loren | 293/110 |
| 5,306,058 A | 4/1994 | Sturrus et al. | |
| 5,340,178 A | * 8/1994 | Stewart | 293/122 |
| 5,545,022 A | * 8/1996 | Rosasco | 425/110 |
| 5,577,796 A | * 11/1996 | Clausen | 296/202 |
| 5,803,517 A | * 9/1998 | Shibuya | 293/120 |
| 5,813,594 A | * 9/1998 | Sturrus | 228/146 |
| 5,829,666 A | * 11/1998 | Takeda | 228/147 |
| 5,997,058 A | * 12/1999 | Pedersen | 293/102 |
| 6,000,738 A | * 12/1999 | Stewart | 293/102 |

* cited by examiner

Primary Examiner—Beth A. Stephan
(74) Attorney, Agent, or Firm—Price Heneveld Cooper Dewitt & Litton

(57) ABSTRACT

A method includes rollforming and sweeping a tubular beam with a constant longitudinal cross section, and then reforming the tubular beam 10 to form a tubular beam having a non-constant cross section. The non-constant cross sections have specific shapes chosen to provide particular structural properties and surfaces along the reshaped beam, and also to provide a stylized appearance, such that the reformed beam is useful as a vehicle bumper. In particular, the reshaped beam includes integrally formed vehicle mounting structure, angled end sections forming aerodynamic but impact-resistant bumper ends, and a high-energy absorbing but flexible center section.

29 Claims, 2 Drawing Sheets

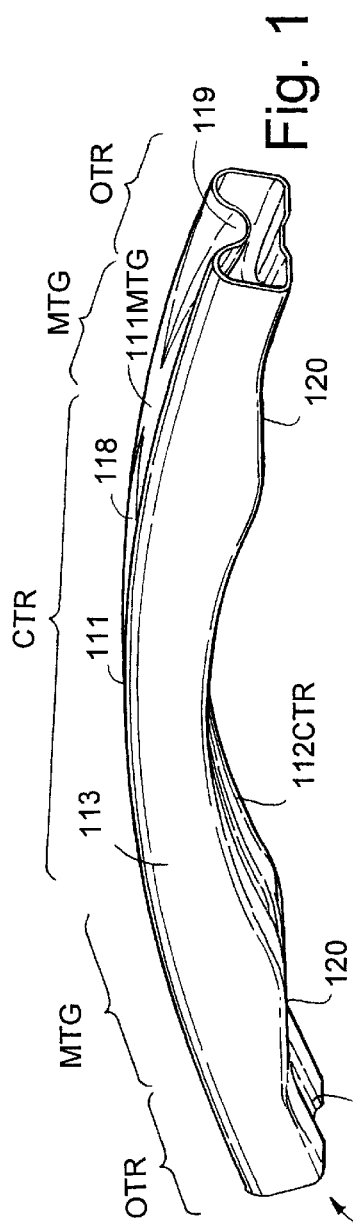
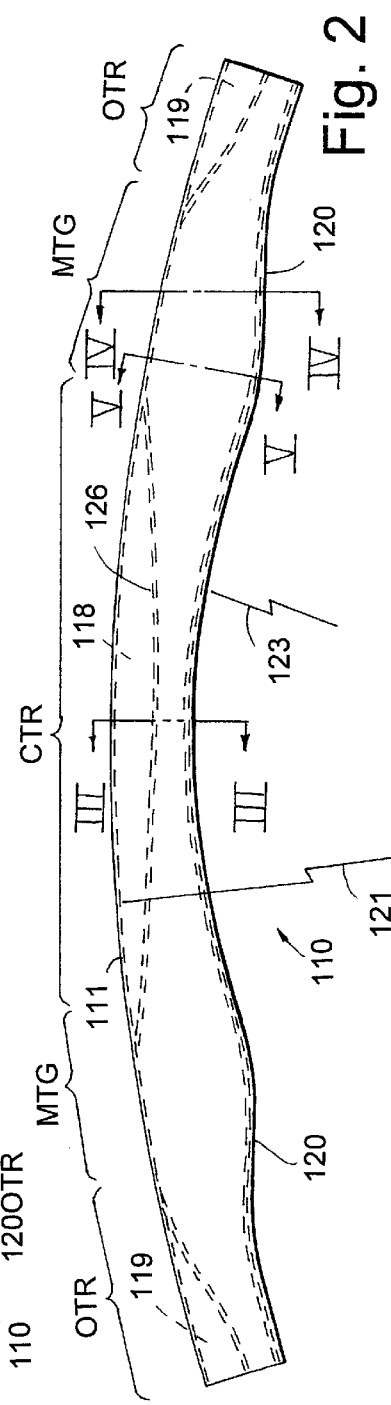
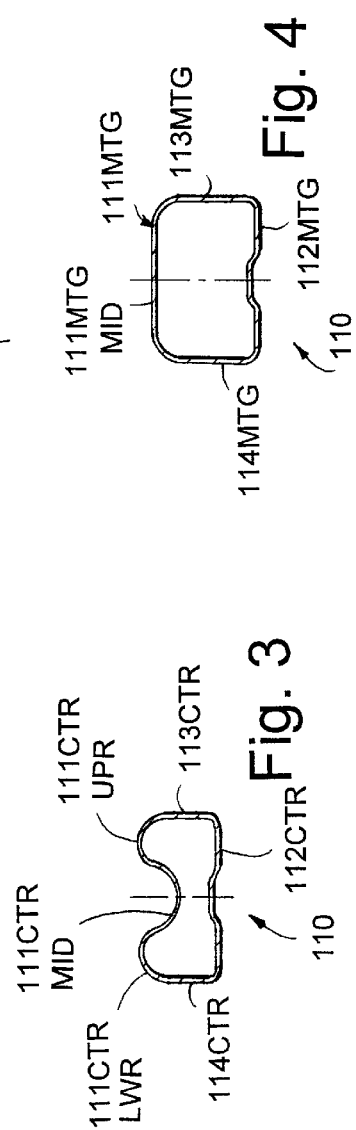
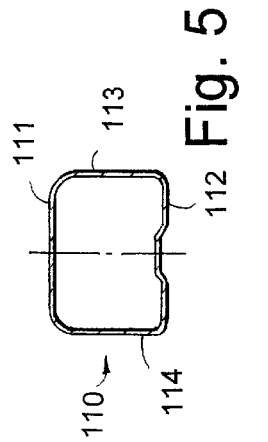

US 6,349,521 B1

VEHICLE BUMPER BEAM WITH NON-UNIFORM CROSS SECTION

BACKGROUND OF THE PRESENT INVENTION

The present invention relates to tubular bumper beams for vehicles.

Apparatus and methods are disclosed in U.S. Pat. Nos. 5,092,512 and 5,454,504 for rollforming and sweeping (i.e., longitudinally curving) tubular bumper beams for vehicles. However, further improvements are desired. For example, it is desirable to integrate components and features into the beam, such as the vehicle mounting structure, without adding to the number of secondary operations that must be performed on the beams. Further, it is desirable to provide beams having different flexural properties along their length. For example, it is preferable in some beams to have increased flexibility in a center area and at end areas of the beam, but increased stiffness at vehicle mounting locations of the beam. Still further, it is desirable to add style and irregularities along a length of the beam in some vehicle models.

Accordingly, a bumper and method are desired solving the aforementioned problems and providing the aforementioned advantages.

SUMMARY OF THE PRESENT INVENTION

In one aspect of the present invention, a bumper construction for vehicles includes a tubular beam having a length and a longitudinal cross section that varies along the length. The tubular beam includes front and rear walls that have center sections with longitudinally extending arcuate surfaces defining different radii that extend around different vertical axes, and includes top and bottom walls that connect tee front and rear walls.

In another aspect of the present invention, a bumper construction for vehicles includes a tubular beam having a length and a longitudinal cross section that varies along the length. The tubular beam includes a rear wall having a center section that defines a longitudinally extending arcuate surface, having a mounting section on each end of the center section that defines a flat mounting surface, and having a corner section on each outer end of the respective mounting sections that sweeps rearwardly from the flat mounting surface. The tubular beam further includes top and bottom walls that connect the front and rear walls and that extend generally horizontally when in a car-mounted position.

In another aspect of the present invention, a method includes steps of forming a tubular beam having a length and a longitudinal cross section that varies along the length, including forming front and rear walls to have center sections with longitudinally extending arcuate surfaces defining different radii that extend around different vertical axes, and forming top and bottom walls that connect the front and rear walls.

In another aspect of the present invention, a method includes steps of rollforming a tubular beam with a constant longitudinal cross section, and reshaping portions of the tubular beam at locations spaced from ends of the tubular beam to form a non-uniform cross section along a length of the tubular beam.

In another aspect of the present invention, a method includes steps of providing a longitudinally curved tubular beam with a constant longitudinal cross section. The tubular beam has a front wall and a back wall spaced from the front wall. The front wall has top, bottom, and center areas. The method further includes outwardly forming the center area in the front wall along different portions of the tubular beam to form a non-uniform cross section along the length.

These and other features, advantages, and objects of the present invention will be further understood and appreciated by those skilled in the art by reference to the following specification, claims, and appended drawings.

BRIEF DESCRIPTION OF DRAWINGS

FIG. 1 is a perspective view of a tubular beam embodying the present invention;

FIG. 2 is a top view of the tabular beam shown in FIG. 1;

FIGS. 3–5 are cross sections taken along the lines III—III, IV—IV, and V—V in FIG. 2;

DETAILED DESCRIPTION OF PREFERRED EMBODIMENT

Figure 6:
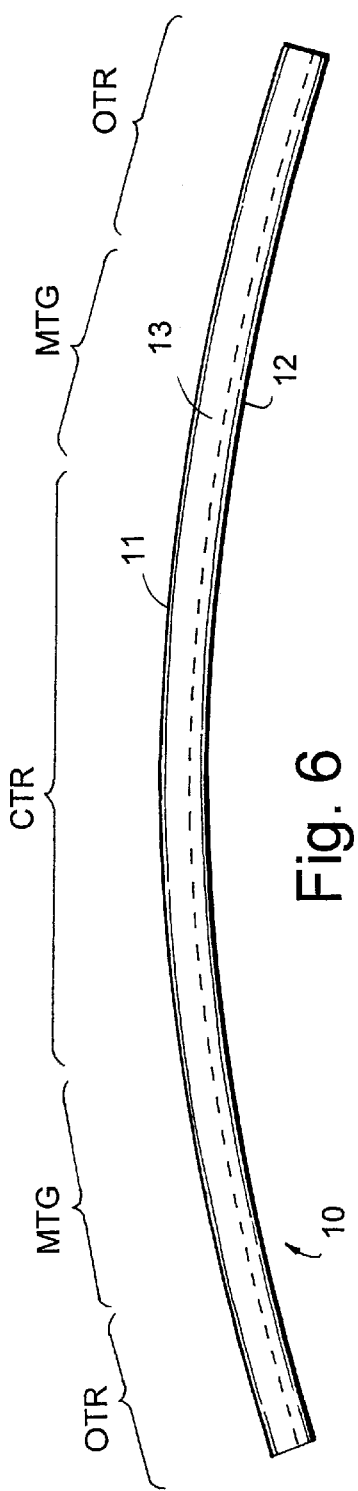
FIG. 6 is a top view of the tubular beam as original rollformed and swept, prior to being reformed.
Figure 7:
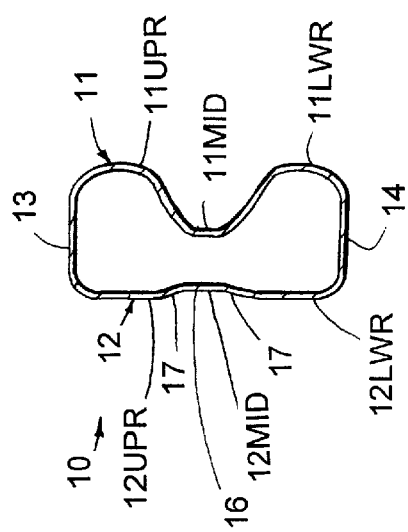
FIG. 7 is a cross section taken along the line VII—VII in FIG. 6.

The present invention includes rollforming and sweeping a tubular beam 10 (FIG. 6) with a constant longitudinal cross section (FIG. 7), and then re-forming the tubular beam 10 to form a tubular beam 110 (FIGS. 1 and 2) having a non-constant cross section (FIGS. 3–5). The non-constant cross sections have specific shapes chosen to provide particular structural properties and surfaces along the reshaped beam and also to provide a stylized shape for matching a fascia design, as discussed below.

The following terms are used in this description to refer to areas of the beam. The tubular beam 10 (FIG. 7) has front, rear, top, and bottom walls 11, 12, 13, and 14, respectively, and has a horizontal center section CTR (FIG. 6), a mounting section MTG on each side of the center section CTR, and outer end sections OTR on each end of the mounting section MTG. The front wall 11 (FIG. 7) has upper, vertical/middle, and lower areas UPR, MID, and LWR, respectively. The reformed beam 110 has identical designations to rollformed beam 10, but with 100 being added to the identifying numbers. For example, the reshaped tubular beam 110 (FIG. 2) has a recess 118 in the middle area MID of the center section CTR of the front wall 111. These identifiers are combined as needed in this description to refer to specific areas of the beams.

The rollformed tubular beam 10 (FIG. 7) includes front, rear, top, and rear walls 11, 12, 13, and 14 forming a tube with a constant transverse cross section along its length. The middle area MID on the front wall 11 is recessed toward the rear wall 12 about half way. The middle area MID forms a radiused channel that faces forwardly, while the upper and lower areas UPR and LWR form radiused protrusions that face toward rear wall 12. A middle area MID on rear wall 12 is recessed a small amount toward the front wall 11. A weld line 16 runs along a midpoint of the recessed middle area MID of rear wall 12. The weld line 16 is the structure that bonds edges of a rollformed sheet together to form the tubular beam 10. The recessed middle area MID of rear wall 12 is advantageous in that angled opposing gripping surfaces 17 are formed that facilitate driving the rollformed sheet forwardly across a sweeping station to form the curvilinear shape of the tubular beam 10. Also, the recessed middle area MID of rear wall 12 takes the weld line 16 out of coplanar relationship to the rest of the rear wall 12, thus reducing the destabilizing effect of the welded material as it is heated and then cooled during the welding process. Also, the recessed middle area MID of rear wall 12 moves the weld line 16 closer to a centerline of the tubular beam 10, thus making it easier to sweep/curve the tubular beam 10, keeping in mind that the weld line 16 includes weld material that is harder than the rest of the material of the tubular beam 10. The recessed middle area MID of rear wall 12 also provides a place for material on the rear wall 12 to flow into and out of in a predictable manner during the reforming process described below. The recessed middle area MID of front wall 11 has a similar affect on the front wall 11.

The reshaped tubular beam 110 (FIG. 2) includes a reformed front wall 111 that has a recess 118 in its middle area MID along the center section CTR of front wall 111 and recesses 119 in its middle area MID along the end section OTR of front wall 111. However, in beam 110, the middle area MID of the mounting section MTG of front wall 111 has been reformed outwardly, such that the front wall 111 in the mounting section MTG is substantially vertically flat. The mounting section MTG of rear wall 112 has also been reformed to form flat mounting pads 120 that are coplanar with each other on each end of the reformed beam 110. Holes are formed in the mounting pads 120 to receive bolts (not specifically shown) for attaching the tubular beam 110 to a vehicle. Alternatively, mounting brackets can be welded to the flat mounting pads 120 to provide attachment structure for attaching the tubular beam 110 to a vehicle.

It is noted that a total length around a perimeter of the reformed beam 110 at any given location is about the same. For example, the total length of the front, rear, top, and bottom walls 111, 112, 113, and 114 in each of the cross sections of FIGS. 3–5 is about the same. Also, this total length is about the same as the total length around the cross section of the rollformed swept tubular beam 10. Some stretching and work hardening of the material does occur as the material is reformed from the original tubular beam 10 to the shape of the reshaped tubular beam 110. The amount of stretching and work hardening of the material will depend on the material itself, as well as the reforming process. For example, it is contemplated that steels will be used that work harden and take on a newly deformed shape when elongated over three percent. Work hardened material adds strength to the beam 110, particularly in the mounting section MTG where the most material deformation occurs.

The beam 110 can be made from many different materials, with properties of hardness, tensile strength, work hardenability, thickness, and other properties being a function of the design requirements of the bumper to be manufactured. For example, a prototype of the illustrated beam was made from 6013-T6 aluminum having a wall thickness of about 2.4 mm, and a good tensile strength. This prototype was made of aluminum so that it could be easily and quickly made for testing. However, it is contemplated that the scope of the present invention includes reshaped beams made from 70–200+ KSI tensile strength steels with thicknesses of about 1.0 mm. For example, it is contemplated that any of the materials disclosed in U.S. Pat. Nos. 5,092,512 and 5,454,504 can be successfully used in the present disclosed process.

The large box-like shape of the cross section in the mounting section MTG (FIGS. 4 and 5) results in a higher strength in the mounting section MTG than in the remaining center and outer end sections CTR and OTR of the reshaped beam 110. However, this is desirable, since the designers of the illustrated beam 110 preferred a center section CTR that flexes and provides a significant stroke during a front impact over which energy is absorbed before the reshaped beam 110 collapsed. Further, it was desired that outer end sections OTR of the reshaped tubular beam 110 flex to withstand considerable corner impacts, while still remaining structurally impact resistant. It is noted that during the reshaping process, portions of one wall may stretch and flow onto other walls. For example, in the mounting section MTG, portions of the front wall 111 flow and stretch onto the top and bottom walls 113 and 114. It is noted that in the illustrated reshaped beams 110, the top and bottom walls 113 and 114 are maintained in a substantially flat and horizontal orientation when in a car-mounted position, so that maximum energy is absorbed in a typical vehicle crash. Further, the perpendicular cross sections (see FIGS. 3–5) of the illustrated reshaped beam 110 are symmetrical from top to bottom. However, it is contemplated that the present invention is broad enough in scope to include cross sections that are not vertically symmetrical. For example, it is contemplated that the lower area LWR could be enlarged forwardly along all or part of the reshaped beam 110, such that the reshaped beam 110, when in a vehicle-mounted position, causes air to flow upward over the beam 110 at an angle. Further, this angled shape would match an aerodynamic shape of front fascia 9. Also, the front wall 111, including lower, middle, and upper armas LWR, MID, and UPR could form an upwardly angled flat (or curvilinear) front surface.

The illustrated reshaped beam 110 (FIG. 2) includes a center section CTR where the front wall 111 forms a first radius 121 about a first center point, the center section CTR of rear wall 112 forms a second radius 123 about a second center point, with the first and second radii 121 and 123 being different lengths and the first and second center points beng at different locations. Further, the center section CTR of top and bottom walls 113 and 114 are relatively flat. This forms a particularly strong, impact-resistant beam that is well adapted to bridge between the mounting pads 120 and withstand forces communicated against the beam 110. The reasons for the strength and advantages of this style beam 110 in terms of handling and distributing stress are well documented in the engineering art of bridge construction and will not be repeated here. It is sufficient to note that because of the two different radii on the center sections CTR of front and rear walls 111 and 112, respectively, and due to the flat center sections CTR of top and bottom walls 113 and 114, respectively, that extend therebetween, the bumper beam 110 absorbs a high amount of energy over a full stroke of the beam 110 on impact and before collapse.

Figure 8:
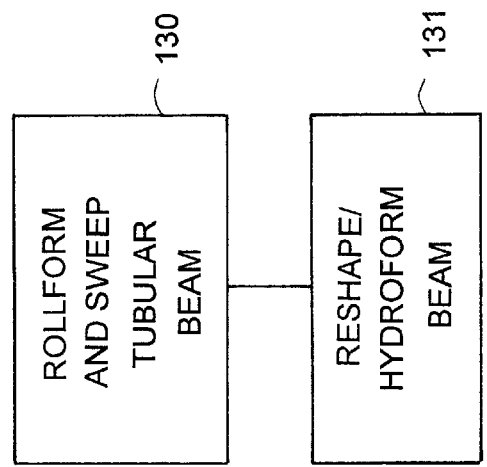
FIG. 8 is a flow diagram showing steps of the present invention.

The preferred process for forming the rollformed tubular beam 10 in a first step 130 (FIG. 8) and then reshaping the beam 10 into beam 110 by a hydroforming process in a second step 131. Hydroforming is a well-known process where a bladder or expandable member is positioned inside of a tubular member and expanded, thus pressing the tubular member against an outer die to reshape the tubular member. It is not believed necessary to describe the hydroforming process in detail here because of the well-known nature of hydroforming. Nonetheless, the following disclosure is included for the reader's benefit. The rollformed beam 10 is placed between outer dies having a particularly shaped cavity and a bladder is positioned within the rollformed beam 10. The bladder includes outer protective strips or coverings that are durable and also prevent puncture of the bladder. Fluid is forced into the bladder, causing the bladder to expand. As the bladder expands, portions of the tubular beam 10 are forced outwardly to form the reshaped beam 110. For example, the middle area MID of the mounting section MTG of the front wall 111 is forced outwardly to form a flat frontal surface with the upper and lower areas UPR and LWR of the front wall 111 (see FIGS. 4 and 5). Also, upper and lower areas UPR and LWR of the mounting section MTG of front wall 111 flow onto the mounting section MTG of top and bottom walls 113 and 114, respectively. It is important that the material not stretch too much or it may tear or distort unacceptably; yet the material must be deformed enough to retain its new shape and preferably to be work hardened to some extent. For this reason, a total length around the cross section of the rollformed beam 10 is chosen to be close to but slightly less than a total length around the cross section of the reshaped beam 110. Optimally, a stretch of about 10 percent is desired, and at least a stretch of about three percent is required to hold the new shape, although more or less can work satisfactorily depending upon the material properties. Notably, the tubular beam 110 is welded full length to form an airtight chamber, such that it is possible in some beams shaped to simply fill the tube with fluid and pressurize the fluid without the need for a bladder. Where significant reshaping is desired and/or high fluid pressures are needed and sealing is required, the inside of the beam 110 can be coated with a film and then filled with fluid to assist in pressurizing the fluid without being sensitive to leaks or weak weld areas.

The reshaped beam 110 (FIG. 2) includes several changes in its cross-sectional shape, but these changes are made gradually as opposed to immediately. For example, the recess formed in the middle area MID of the center section CTR of front wall 111 is eliminated, with the deepest part of the recess being at a longitudinal center of the reshaped beam 110, and with the recess becoming shallower and shallower as one moves toward the mounting section MTG of front wall 111. The recess 118 characteristically has a bottom surface 126 that is linear when viewed from above. The end-located recess 119 is formed by the middle area MID being recessed into the outer end section OTR of front wall 11 as one moves from the mounting section MTG of the front wall 111 to the outer end section OTR of the front wall III. Notably, the end-located recess 119 can be formed deep enough to result in the outer end section OTR of front wall 111 being angled rearwardly relative to the front surface of the MTG of front wall 111, thus providing an aerodynamically shaped surface at an end of the reshaped beam 110.

Notably, the present process illustrates a circumstance where the rollformed beam 10 is only formed outwardly to form reshaped beam 110. However, it is contemplated that the hydroform process can form the material of a rollformed beam inwardly in some areas as well. For example, it may be desirable to inwardly form the middle area MID of the outer end section OTR of the front wall 111, so that the outer end section OTR of front wall 111 has an increased angular relation to the front wall in the mounting section MTG of front wall 111. This would provide an aerodynamic sweep at the ends of the bumper (at the vehicle fenders), which is desired in modern vehicles. Also, it is contemplated that extruded beams and beams formed other than by rollforming can be reshaped utilizing the present teachings, and that such variations and modifications are within the scope of the present invention.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A bumper construction for vehicles comprising:
a tubular beam having a length and a longitudinal cross section that varies along the length and further having spaced-apart mounts adapted for mounting to a vehicle frame, the tubular beam, when oriented in a car-mounted position, being divided in half longitudinally by a perpendicular vertical plane and including front and rear walls that have center sections with longitudinally extending arcuate surfaces defining different radii that extend between the mounts and that extend around different centerpoints lying on said vertical plane, and including relatively flat top and bottom walls that extend between the mounts and that connect the front and rear walls.

2. The bumper construction defined in claim 1, wherein the top and bottom walls extend generally horizontally when in the car-mounted position.

3. The bumper construction defined in claim 2, wherein the radii defined by the center section of the front wall is greater than the radius defined by the center section of the rear wall.

4. The bumper construction defined in claim 3, wherein the rear wall includes mounting surfaces formed longitudinally outward from the center section of the rear wall.

5. The bumper construction defined in claim 4, wherein the mounting surfaces include a pair of relatively flat areas formed on the rear wall that are coplanar.

6. The bumper construction defined in claim 1, wherein the front wall includes a pair of outer end sections that form a compound angle with ends of the center section of the front wall.

7. The bumper construction defined in claim 1, wherein a first transverse cross section through a center of the tubular beam defines a "B" section, but wherein a second transverse cross section through a location at an end of the center section of the rear wall approximates a rectangular section.

8. The bumper construction defined in claim 7, wherein the tubular beam includes flat mounting sections formed on the rear wall outwardly of but adjacent an end of the center section of the rear wall.

9. The bumper construction defined in claim 8, wherein the top and bottom walls are flat along a full width and length of the tubular beam.

10. The bumper construction defined in claim 1, wherein the front wall includes opposing ends that form a compound angle with an adjacent end portions of the center section of the front wall.

11. A bumper construction for vehicles comprising:
a rollformed tubular beam made from sheet material having a constant thickness and having a length and a longitudinal cross section that varies along the length, the tubular beam including a rear wall having a center section that defines a longitudinally extending arcuate surface, a mounting section on each end of the center section formed from material of the rear wall that defines a flat co-planar mounting surface, and a corner section on each outer end of the respective mounting sections that sweeps rearwardly from the associated flat mounting surface, and including flat top and bottom walls that connect the front and rear walls.

12. The bumper construction defined in claim 11, wherein the front wall includes a center section that defines a longitudinally extending arcuate surface with a radius different than a radius of the center section of the rear wall.

13. The bumper construction defined in claim 12, wherein the front wall includes opposing ends that form a compound angle with an adjacent end portion of the center section of the front wall.

14. A method comprising steps of:

forming a sheet of material having a constant wall thickness into a tubular beam having a length and a longitudinal cross section that varies along the length, including forming front and rear walls to have center sections with longitudinally extending arcuate surfaces defining different radii that extend around different centerpoints, and forming flat top and bottom walls that connect the front and rear walls and that extend generally horizontally when in a car-mounted position, the step of forming the front wall including hydroforming areas at ends of the center section and reforming an outer end section of the front wall outward of the center section of the front wall to cause the outer end section to define a compound angle with an end of the center section of the front wall while maintaining a flat shape of the top and bottom walls.

15. The method defined in claim 14, wherein the step of forming the front and rear walls includes forming flat coplanar mounting surfaces on the rear wall outward of the center section of the rear wall.

16. A method comprising steps of:

rollforming a sheet of material having a constant wall thickness into a tubular beam with a constant B-shaped longitudinal cross section, the B-shaped longitudinal cross section, when in a car-mounted position, including material forming top and bottom lobes and a center region that define a B-shaped cavity; and reshaping portions of the tubular beam at locations spaced from ends of the tubular beam to form a non-uniform cross section along a length of the tubular beam, including enlarging portions of the beam to form an increased internal cavity size.

17. The method defined in claim 16, wherein the step of rollforming includes forming the tubular beam to have a "B" shaped cross section.

18. The method defined in claim 16, wherein the step of enlarging includes forming front and rear walls of the tubular beam to have arcuate surfaces that define dissimilar radii.

19. The method defined in claim 16, wherein the step of enlarging includes forming flat mount pads on a rear wall of the tubular beam by hydroforming.

20. The method defined in claim 16, wherein the constant longitudinal cross section includes at least one depressed area, and wherein the step of enlarging includes pushing out selected areas of the depressed area to form a larger cross section in the selected areas.

21. The method defined in claim 16, wherein the steps of forming and enlarging include maintaining the top and bottom walls in a substantially flat condition.

22. The method defined in claim 16, wherein the step of rollforming defines a longitudinal direction, and wherein the step of reshaping is performed longitudinally in-line with the step of rollforming.

23. The method defined in claim 16, wherein the step of reshaping is performed at a location separate from and not longitudinally aligned with the step of rollforming.

24. A method comprising steps of:

providing a longitudinally curved tubular beam with a constant longitudinal cross section, the tubular beam having a front wall and a back wall spaced from the front wall, the front wall having top, bottom, and center areas defining a constant B-shaped internal cavity with the back wall; and outwardly forming the center area in the front wall at locations spaced longitudinally from a mid point of the tubular beam to form a non-uniform cross section along a length of the tubular beam where the internal cavity remains B-shaped in center and end locations but is approximately rectangularly shaped in mounting locations adapted for mounting to a vehicle frame.

25. A bumper construction for vehicles comprising:

a tubular beam having a length and a longitudinal cross section that varies along the length and further having spaced-apart mounts adapted for mounting to a vehicle frame, the tubular beam, when oriented in a car-mounted position, including front and rear walls that have center sections with longitudinally extending arcuate surfaces defining different radii and that extend around different centerpoints, and including relatively flat top and bottom walls that connect the front and rear walls, the longitudinal cross section being generally rectangularly shaped at the mounts but B-shaped at a central location and at end locations.

26. A method comprising steps of:

rollforming a sheet of material having a constant wall thickness of less than about 2.4 mm into a tubular beam having a length and a longitudinal cross section that varies along the length, including forming front and rear walls to have center sections with longitudinally extending arcuate surfaces defining different radii that extend around different centerpoints, and forming flat top and bottom walls that connect the front and rear walls and that extend generally horizontally when in a car-mounted position, the step of forming the front wall including hydroforming areas at ends of the center section with at least a 3% stretch in some areas to cause permanent deformation and a set in the front wall.

27. The method defined in claim 26, wherein the step of forming the front wall includes permanently stretching the front wall material less than 10% elongation.

28. A method comprising steps of:

rollforming a sheet of material having a constant wall thickness and a tensile strength of at least 70KSI to form a tubular beam with a constant longitudinal cross section; and reforming the tubular beam to reshape portions of the tubular beam to form a non-uniform cross section along a length of the tubular beam, including shaping portions of the beam to form an increased internal cavity size.

29. The method defined in claim 28, wherein the step of rollforming defines a longitudinal direction, and wherein the step of reshaping is performed longitudinally in-line with the step of rollforming at an end of a rollforming apparatus.

* * * * *